United States Patent [19]

Benson et al.

[11] Patent Number: 4,815,110
[45] Date of Patent: Mar. 21, 1989

[54] METHOD AND A SYSTEM FOR SYNCHRONIZING CLOCKS IN A BUS TYPE LOCAL NETWORK

[75] Inventors: Bengt H. Benson, Spanga; Per A. Edström, Solna, both of Sweden

[73] Assignee: U.S. Philips Corporation, New York, N.Y.

[21] Appl. No.: 23,411

[22] Filed: Mar. 9, 1987

[30] Foreign Application Priority Data

Mar. 7, 1986 [SE] Sweden ............................... 8601073

[51] Int. Cl.⁴ ............................................... H04J 3/06
[52] U.S. Cl. ...................................... 375/107; 370/103
[58] Field of Search ......................... 370/85, 100, 103; 375/106, 107, 118

[56] References Cited

U.S. PATENT DOCUMENTS

| | | | |
|---|---|---|---|
| 4,117,661 | 10/1978 | Bryant, Jr. | 375/107 |
| 4,530,091 | 7/1985 | Crockett | 370/103 |
| 4,592,050 | 5/1986 | Bensadon | 370/103 |
| 4,596,025 | 6/1986 | Satoh | 370/85 |
| 4,607,257 | 8/1986 | Noguchi | 375/107 |

Primary Examiner—Douglas W. Olms
Assistant Examiner—Wellington Chin
Attorney, Agent, or Firm—Brian J. Wieghaus

[57] ABSTRACT

The invention relates to a method of synchronizing clocks contained in a local network of bus type, such as Ethernet and a system of synchronizing clocks. In local networks of this kind a number of nodes are connected to a common data channel. The object of the invention is to obtain a method and a system of synchronizing the clocks which is more accurate than previous methods and systems, in which the synchronizing information is transmitted as common data packages in which the receiver of the synchronizing information does not know the instant of the data package generation. According to the invention a synchronizing message is transmitted from one node which has been chosen to be the master to all nodes, the master node inclusive. When receiving a synchronizing message the nodes read the clock state. Then the master node transmits a clock time message containing the master node clock state when it received the synchronizing message. The clock state indicated by the received clock time message is compared in the slave nodes with the clock states which have been read in the slave nodes. The clock states of the read clocks are compared with the received master clock state and the clock stats of the slave nodes are corrected in dependance on the outcome of the comparison. The clock synchronizing according to the above is suitable for, e.g., military applications.

13 Claims, 3 Drawing Sheets

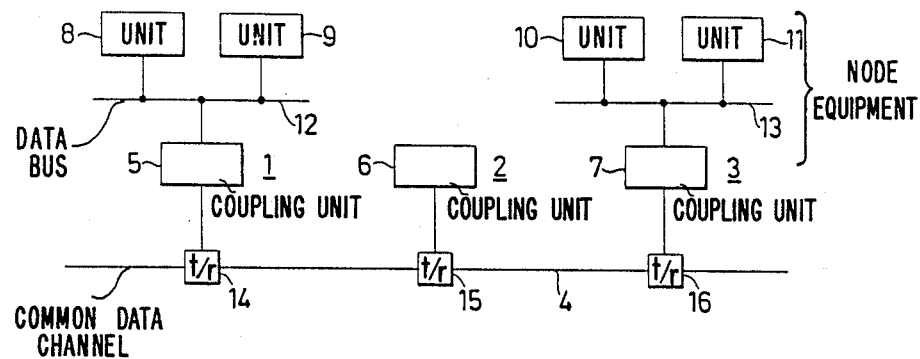
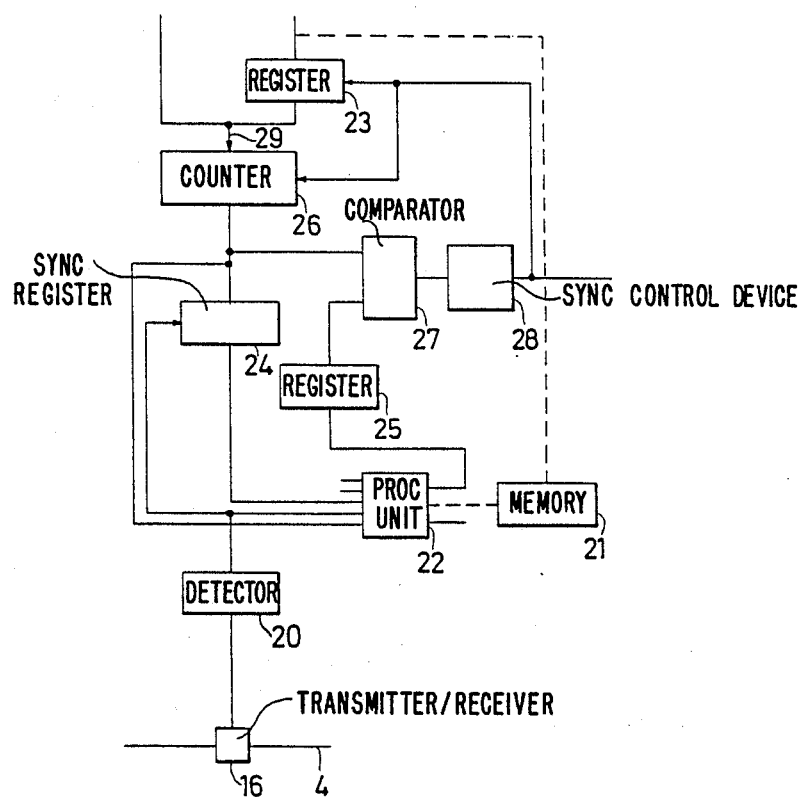

METHOD AND A SYSTEM FOR SYNCHRONIZING CLOCKS IN A BUS TYPE LOCAL NETWORK

BACKGROUND OF THE INVENTION

The present invention relates to a method of synchronizing clocks in a bus type network, such as Ethernet, in which a number of nodes containing said clocks are connected to a common data channel. The invention also relates to a system of synchronizing clocks contained in a bus type local network, such as Ethernet, comprising a number of node equipments connected to a common data channel, each node equipment comprising an operating unit in the shape of a coupling unit and possibly further operating units, one of the node equipments being a synchronizing master, the master node, and the further node equipments being the slave nodes. In this context by node is meant on one hand the point of intersection itself between the data channel and the equipment coupled to the node and on the other hand the point of intersection inclusive of the equipment coupled to the node. The word "node" in the last mentioned meaning is also called "node equipment" in the following.

In local nets having a channel common to a multiplicity of nodes, e.g. of Ethernet type, the requirements until now on the synchronizing of the clocks in node equipment connected to the data channel have not been very high. For example, it has been possible to transmit information about the clock times of the nodes between the nodes as normal data messages. However, the transmit time of a data message varies to a great extent. Due to the fact that a multiplicity of nodes are connected to a common data channel, the data channel may be engaged with a transmission of other data messages and the data message containing the clock time is then forced to wait in a transmitter queue. When the data message containing the clock time reaches the receiving nodes the transmitted clock time is thus often inadequate. Until now it only has been possible to use such a net in applications in which the synchronizing between the nodes is not critical. However, strong desires exist to be able to use local networks having a common channel even in applications demanding a more accurate synchronizing, such as defense applications. One reason for this is the saving of space obtained by using a common data channel instead of a lot of separate connections. Another reason is the aspect of cost due to the fact that a common channel simplifies and cheapens the installation.

SUMMARY OF THE INVENTION

It is an object of the invention to provide a method of clock synchronizing admitting a more accurate synchronizing and which is simple to embody at a low cost. The method according to the invention is obtained in that one of the nodes in the data net is chosen to be a synchronizing master, the master node, that the master node repeatedly transmits a synchronizing message addressed to all of the nodes of the nodes requiring synchronizing, the master node inclusive, that the master node and the further nodes, the slave nodes, when detecting a synchronizing message read the state of a first clock in the respective node and store the state as the time of arrival for the synchronizing message, that the master node when having detected the synchronizing message transmits a clock time message to the slave nodes indicating the state of the master node clock at the instant of the arrival of the synchronizing message to the master node, that the state of the clock time message transmitted by said master node is compared with the times of arrival stored in the slave nodes for the synchronizing message and in case of a deviation the clocks in the slave nodes are corrected to a closer correspondance with the clock which is read in the master node.

According to a favorable variant of the method the clocks in the slave nodes are corrected by adding a number of additional counting pulses or by suppressing a number of ordinary counting pulses depending on whether the clock to be corrected is slow or fast relative to the master clock.

According to another favorable variant of the method, the clocks in the slave nodes are corrected by load a register located in each slave node with a calculated comparative value consisting of the sum of a fixed number and the stored state for the read clock substrate with the clock state of the transmitted clock time message and with a load correction value, that the calculated comparative value is compared with the least significant digits of the clock state in question in the first clock of the node and when these two values coincide a synchronizing pulse is generated which loads the fixed number into the least significant clock digits of the node clocks.

Further favorable variants of the method according to the invention are apparent from the enclosed claims.

The system according to the invention is characterized in that the following means are arranged in each of the coupling units:
  means for detecting a synchronizing message on the data channel;
  means for reading the state of a clock in the coupling unit,
  means for storing the state of the clock, and
  means for receiving a clock time message,
  in that the following means further are arranged in the coupling units of the slave nodes:
  means for data processing by means of which the state of a received clock time message and the stored time of arrival is compared, and
  means for correcting the clock to a closer correspondence with the clock
which is read in the master node, and in that the following means are arranged in the master node:
  means for data processing by means of which a synchronizing message repeatedly is transmitted and clock time messages are transmitted.

Further favorable variantes of the system are apparent from the enclosed claims.

BRIEF DESCRIPTION OF THE DRAWINGS

The invention will now be described in more detail with reference to the accompanying drawings; FIG. 1 shows a local network having three nodes; FIG. 2 shows a partly simplified block diagram of a part of the node equipment.

DESCRIPTION OF THE PREFERRED EMBODIMENT

Figure 3:
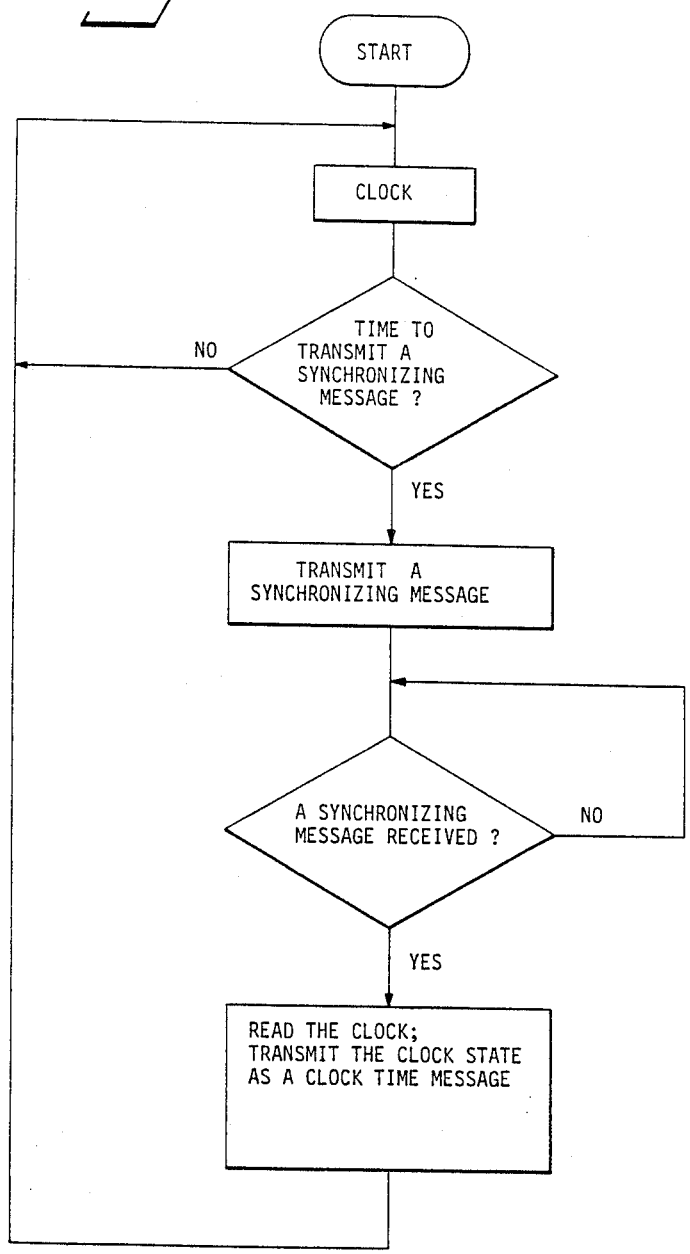
FIG. 3 shows a flow chart for a master node in respect of clock synchronizing.

The local network shown in FIG. 1 consists of three node equipments 1, 2, 3 connected to a common data channel 4. Each node equipment consists of a number of operating units 5-11. In FIG. 1 the node equipments 1 and 3 are each provided with three operating units 5, 8, 9 and 7, 10, 11, respectively, while the node equipment 2 is provided with one operating unit 6. In the case that a multiplicity of operating units are connected to a common node, these operating units suitably are, as shown in the fig, connected by means of a data bus, 12, 13. Each operating unit 5-11 normally contains a clock, which is shown in FIG. 2. The clocks of operating units within a node equipment are maintained synchronized with each other due to the fact that the operating unit 5-7 are located between the data channel 4 and the data bus of the node equipment. These operating units 5, 6, 7 in the following termed coupling unit 5-7, transmit synchronizing signals to the further operating units 8-11 within the node equipment. The coupling units 5-7 in the respective node equipments are coupled to the data channel 4 via a transmitter/receiver device 14, 15 and 16, respectively.

The mutual synchronizing of the clocks in the coupling units will now be described by means of the flow charts shown in FIG. 3 and 4.

Firstly, however, the coupling unit clock in one of the nodes are selected to be that master clock and hence the node to be the master node. The rest of the nodes coupled to the data channel are regarded as slave nodes in respect of synchronizing. The clocks of the slave nodes shall as far as possible be corrected to coincide with the clock in the master node coupling unit, the master clock.

Figure 4:
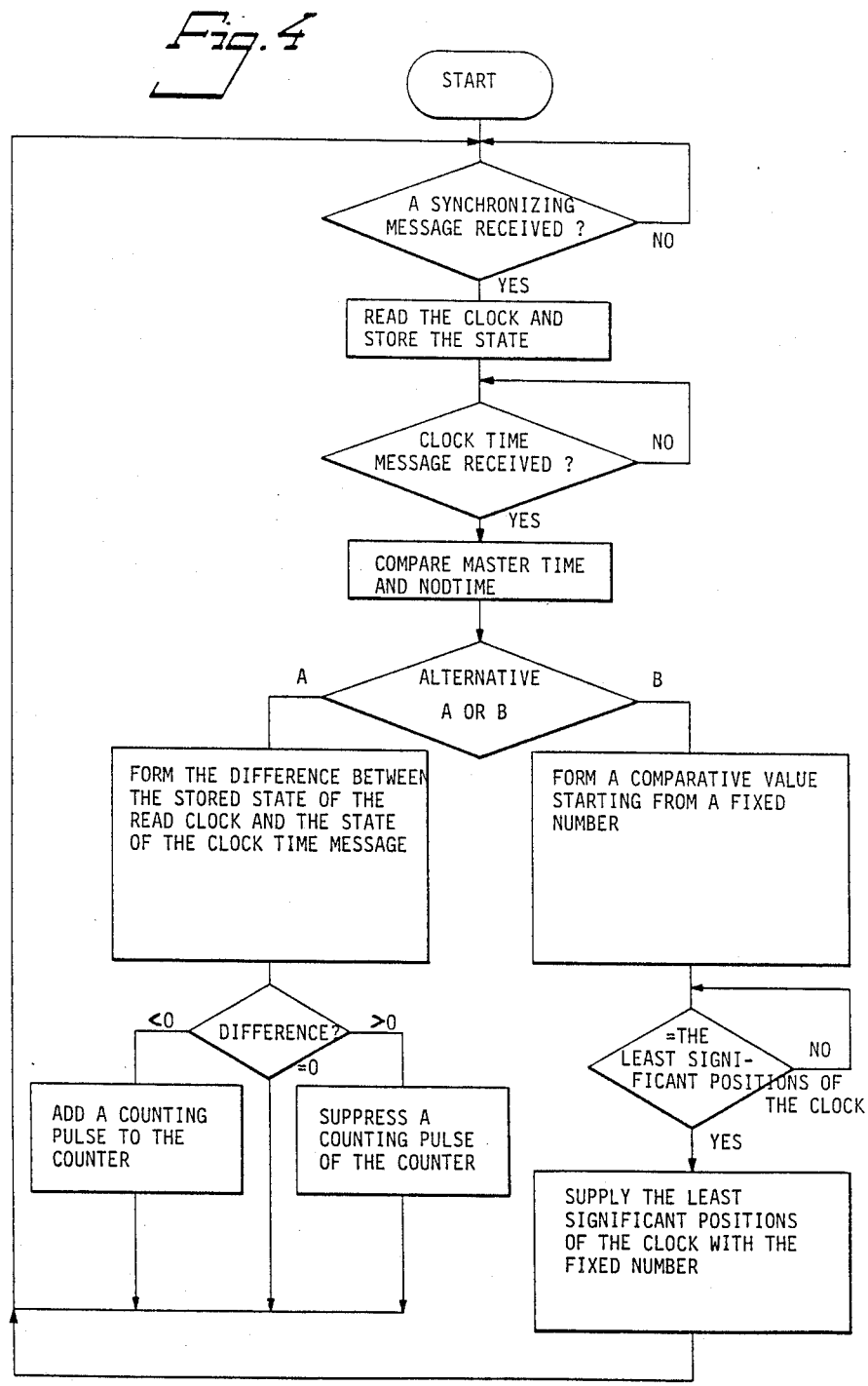
FIG. 4 shows a flow chart for a slave node in respect of clock synchronizing.

The master node transmits a synchronizing message with repetition, see FIG. 3. The synchronizing message is transmitted on the data channel to all of the nodes, even the master node. When the synchronizing message is received in the slave nodes and the master node, the clock in the nodes of the coupling units 5-7 is read. The clock state is stored in a register, 24 in FIG. 2 in each of the coupling units 5-7. When the clock state of the master node coupling unit has been read, the clock state of the master node coupling unit is sent out in the shape of a clock time message to the slave nodes.

According to a first alternative, alternative A, the slave node coupling units forms a difference value consisting of the difference between the stored state for the clock read in the node and the state for the clock time message. If the difference becomes positive a corresponding number of counting pulses of the clock counter are suppressed, if the difference becomes negative the clock counter is supplied with a corresponding number of counting pulses, and if the difference is zero no correction of the clock counter takes place.

According to another alternative, alternative B, the clock state of the received clock time message is subtracted from a fixed number. The fixed number may, e.g., consist of the binary number 1000 0000. Said number is a suitable number due to the fact that it lies in the middle of the switch interval of the most significant digit, that is an equal amount of increase and decrease of the number value is required before the most significant digit changes value. The clock state stored in the respective nodes are added to the result of the above mentioned subtraction. A load correction value, preferably the binary number 10, is subtracted from the result of the said addition. The result of the last mentioned subtraction is termed a comparative value and this value is compared with the clock in the coupling unit. When the comparative value coincides with the state of the most significant digits of the clock count value in the coupling unit, the fixed number is supplied to the least significant digits of the clock count value. In nodes containing a multiplicity of operating units, a synchronizing signal is transmitted from the coupling unit 5 and 7 respectively to the rest of the operating units 8, 9 and 10, 11, respectively, via the respective data bus 12, 13 when the comparative value and the state of the least significant digit of the clock in the coupling unit coincides. The synchronizing signal starts a feeding of the fixed number into the most significant digits of the clocks in the operating units.

The load correction value mentioned above has for its object to compensate for the delay which arises when introducing the fixed value into the clock counters and leads to a simultaneous obtaining of the same value in the least significant positions of the clocks in the slave nodes as that of the master clock.

FIG. 2 shows a partly simplified clock diagram in order to illustrate the synchronizing of a clock in a slave node. There registers 23, 24, 25, a counter 26, a comparator 27, a sync control device 28, a detector 20, a memory 21 and a processor unit 22. When starting, the counter 26 is supplied an initial value via its input 29. The counter input is shown divided into two branches, the right branch being intended for applying of the least significant part, e.g. eight bit positions of the initial value. An input register 23 is contained in the right branch, the operation of which will be more apparent from the description below. The counter 26 is stepped with a constant frequency and its counting position (state) expresses the clock time of the coupling unit 5, 6, 7 and the counter is also termed clock counter or clock. The detector 20 has its input coupled to the data channel 4 and detects synchronizing messages received by the node. Advantageously, the address information of the synchronizing message is utilized when detecting. The clock time message is transmitted as common data messages and has not been shown in more detail. When the detector has detected a synchronizing message, the processor unit 22 is given an interrupt and the synchronizing register 24 located on the counter 26 output is locked. The synchronizing register 24 has followed the content of the counter until now. Accordingly, the clock state when detecting a synchronizing message is stored in the synchronizing register. By means of this method the time of arrival for the synchronizing message is stored so that possible occuring delays, due to the fact that e.g. the processor unit may be busy at the moment of the synchronizing message arrival, do not effect the storing of the time of arrival. When the processor unit 22 receives an incoming clock time message containing the master clock state when detecting the synchronizing message, the correction of the clock may take place according to one of the following two alternatives.

According to alternative A, the clock state stored in the synchronizing register 24 is compared with the clock state indicated by the clock time message, which may be effectde by means of the processor unit 22. If the comparison results in that the synchronizing register clock state is fast relative to the clock time message clock state, the processor unit 22 ensures that one or a multiplicity of counting pulses are suppressed in the counter. If the comparison results in that the synchronizing register clock state is slow relative to the clock time message clock position, the processor unit ensures that one or a multiplicity of additional counting pulses are supplied to the counter in addition to the ordinary counting pulses received from the ordinary clock frequency. If the comparison results in that there does not exist any difference between the synchronizing register clock state and the clock time message clock state no correction of the counter takes place.

According to alternative B, the processor unit 22, when it has received a sychronizing message and a clock time message, calculates a comparative value which is supplied to the correction register 25. The comparative value consist of a fixed value, e.g. the binary number 1000 0000, subtracted with the state of the master clock, added with the slave clock time value, and subtracted with the load correction value, e.g. 10, the master and slave clock state referring to the state when receiving the synchronizing message. The comparator as a way of suggestion compares the eight least significant bits of the counter 26 with the comparative value in the correction register 25. When the correction register value reaches the same value as the value of the, by way of suggestion, eight least significant bits of the counter, the comparator 27 provides a signal to the sync control device 28. The sync control device transmits a synchronizing signal via the data bus 12, 13 to the rest of the operating units 8, 9 and 10, 11, respectively, in the node and to the input register 23. The synchronizing signal starts the supplying of the fixed value which now exists stored in the input register 23 and may be fetched from a memory 21 and brought to the eight least significant digits of the counter. A corresponding supplying of the fixed value takes place in the rest of the operating units 8-11.

The input register 23 shown in FIG. 2 may in a simple embodiment be replaced by a multiplexer device. The multiplexer device comprises as many multiplexers as the number of bit positions in the counter 26 to be supplied with the comparative value, that is a suggestion eight. A control signal applied to the control input of the multiplexers determines if the least significant bit positions in the counter are to be supplied with the comparative value or another value.

The delay occuring on the data channel in the local network has been ignored. The delay is of such an order of magnitude that it doesn't injuriously effect the clock synchronizing and accordingly may be ignored.

The described embodiment according to FIG. 2 is not in any way intended to delimite the invention, but a lot of advantageous embodiments are conceivable within the scope of the invention. As an example the processor unit may carry out a greater or less part of synchronizing method.

What is claimed is:

1. A method of synchronizing clocks contained in a bus type local network having a number of coupling units each comprising a clock and coupled to a common data channel, said method comprising:
    choosing one of the coupling units in the network as a synchronizing master unit, the remaining coupling units in the network requiring synchronization defining slave units;
    cyclically transmitting a synchronizing message from the master unit to the slave units and within the master unit;
    detecting synchronizing messages at each slave unit and the master unit, and reading the state of each slave unit clock and the master unit clock upon detection of a synchronizing message;
    storing the clock state of each unit as the time of detection of the synchronizing message at the respective unit;
    transmitting to the slave units from the master unit the clock state of the master unit at the time of detection of the synchronizing message in the master unit;
    comparing the time of detection of the synchronizing message in each slave unit to the time of detection of the synchronizing message in the master unit;
    correcting the slave unit clocks which deviate from the master unit clock to a state closer to the state of the master unit clock.

2. A method as claimed in claim 11, wherein the clocks in the slave units are corrected by adding a number of additional counting pulses if the clock to be corrected is slow relative to the master unit clock or by suppressing a number of ordinary counting pulses if the clock to be corrected is fast relative to the master unit clock.

3. A method as claimed in claim 1, wherein the slave units are corrected by:
    loading a register located in each slave unit with a comparative value calculated by adding a fixed number to the clock state of the slave unit at detection of the synchronizing message, subtracting the clock value of the master unit at detection of the synchronizing message and subtracting a load correction value;
    comparing the digits of the comparative value with predetermined digits of the clock state in each slave unit clock; and
    generating a synchronizing pulse which loads the digits of the fixed number into corresponding digits of the clock state of a respective slave unit clock when the digits of the comparative value and the predetermined clock digits coincide.

4. A method as claimed in claim 3, wherein the fixed number is a binary number having a plurality of digits and has one of two binary states in the most significant digit and the other binary state in the remaining digits.

5. A method as claimed in claim 4, wherein the fixed number is the binary number 1000 0000.

6. A method as claimed in claim 5, wherein the load correction value is the binary number 10.

7. A method as claimed in claim 3, wherein a synchronizing signal is transmitted from a slave unit to further operating units connected to said slave unit via a data bus, each of the further operating units comprising a clock, the synchronizing signal feeding said fixed number into said predetermined digits of the clock state of the clocks in the further operating units.

8. A method as claimed in claim 1, wherein clocks in further units connected to a slave unit via a data channel are corrected to a state closer to the state of the master clock.

9. In a bus type local network comprising number of coupling units each comprising a clock and coupled to a common data channel, the improvement comprising:
    one of the coupling units being selectable as a master unit and the remaining units defining slave units, the master unit comprising means for cyclically transmitting a synchronizing message within the master unit and to the slave units and for transmitting to the slave units the clock state of the master unit at detection of the synchronizing message;

each coupling unit comprising means for detecting a synchronizing message on the data channel, means for reading the state of the clock in the coupling unit upon detection of the synchronizing message and for storing said clock state, and means for receiving said master unit clock state; and each slave unit further comprising means for comparing the clock state of the slave unit at detection of the synchronizing message with the state of the master unit clock at detection of the synchronizing message, and means for correcting the slave unit clocks to a state closer to the state of the master clock.

10. A bus type local network as claimed in claim 9, comprising each coupling unit having means for cyclically applying a counting pulse to its respective clock for sequentially advancing the clock state, and each slave unit further comprises means for applying an additional number of counting pulses to its clock if the slave unit clocks are slower relative to the master clock and for suppressing a number of pulses from said cyclic application of pulses if the slave unit clocks are faster than the master clock.

11. A bus type local network as claimed in claim 10, wherein said network comprises a further unit having a clock connected to a coupling unit via a data bus, and said coupling unit comprises means for correcting the clock of said further unit to a state closer to the state of the master unit clock.

12. A bus type local network as claimed in claim 11, wherein said correcting means comprises each slave unit having:

an input register for storing a fixed number comprising a number of digits;

a register for storing a comparative number comprising digits equal to the sum of a fixed number and the stored state of its clock minus said master unit clock state and a load correction number;

a comparator for comparing the digits of the comparative number of the register with a predetermined number of digits of the slave unit clock state;

a sync control device activatable by the comparator when said predetermined digits of the slave unit clock state coincide with respective digits of the comparative number for generating a synchronizing pulse for loading the digits of the fixed number stored in the register into corresponding digits of the slave unit clock state.

13. A bus type local network as claimed in claim 9, wherein said network comprises a further unit having a clock connected to a respective coupling unit via a data bus, and said sync control device of said respective coupling unit comprises means for transmitting said synchronizing pulse to said further units for loading said digits of said fixed number into said predetermined digits of the clock state of said further unit.

* * * * *